US00RE42370E

(19) United States
(12) Reissued Patent
Kuhne

(10) Patent Number: US RE42,370 E
(45) Date of Reissued Patent: May 17, 2011

(54) REDUCED SHOCK TRANSONIC AIRFOIL

(75) Inventor: Craig Miller Kuhne, Cincinnati, OH (US)

(73) Assignee: General Electric Company, Schenectady, NY (US)

(21) Appl. No.: 11/342,234

(22) Filed: Jan. 27, 2006

Related U.S. Patent Documents

Reissue of:
(64) Patent No.: 6,682,301
Issued: Jan. 27, 2004
Appl. No.: 09/972,443
Filed: Oct. 5, 2001

(51) Int. Cl.
*F01D 5/14* (2006.01)

(52) U.S. Cl. ..... 415/181; 415/191; 415/208.2; 416/223 A; 416/243

(58) Field of Classification Search ..... 415/181, 415/191, 192, 193, 208.2, 211.2; 416/223 A, 416/243, 198 A
See application file for complete search history.

(56) References Cited

U.S. PATENT DOCUMENTS

| | | | | |
|---|---|---|---|---|
| 3,953,148 | A | | 4/1976 | Seippel et al. |
| 3,989,406 | A | | 11/1976 | Bliss |
| 4,080,102 | A | | 3/1978 | Schwab |
| 4,131,387 | A | | 12/1978 | Kazin et al. |
| 4,408,957 | A | | 10/1983 | Kurzrock et al. |
| 4,470,755 | A | | 9/1984 | Bessay |
| 4,483,659 | A | | 11/1984 | Armstrong |
| 4,545,726 | A | | 10/1985 | Holliger |
| 4,626,174 | A | | 12/1986 | Sato et al. |
| 4,720,239 | A | | 1/1988 | Owczarek |
| 4,919,593 | A | | 4/1990 | Brown |
| 4,968,216 | A | | 11/1990 | Anderson et al. |
| 5,035,578 | A | | 7/1991 | Tran |
| 5,077,968 | A | | 1/1992 | Branstrom |
| 5,211,703 | A | | 5/1993 | Ferleger et al. |
| 5,221,181 | A | | 6/1993 | Ferleger et al. |
| 5,228,833 | A | | 7/1993 | Schonenberger et al. |
| 5,232,338 | A | * | 8/1993 | Vincent de Paul et al. ... 415/144 |
| 5,249,922 | A | | 10/1993 | Sato et al. |
| 5,277,549 | A | | 1/1994 | Chen et al. |
| 5,292,230 | A | * | 3/1994 | Brown ..... 416/223 A |
| 5,326,221 | A | | 7/1994 | Amyot et al. |
| 5,342,170 | A | | 8/1994 | Elvekjaer et al. ..... 415/192 |
| 5,354,178 | A | * | 10/1994 | Ferleger et al. ..... 416/223 A |
| 5,393,200 | A | * | 2/1995 | Dinh et al. ..... 416/223 A |
| 5,524,341 | A | * | 6/1996 | Ferleger et al. ..... 29/889.7 |
| 5,553,995 | A | | 9/1996 | Martinez |
| 5,554,000 | A | | 9/1996 | Katoh et al. |
| 5,616,000 | A | | 4/1997 | Yamada et al. |
| 5,692,709 | A | | 12/1997 | Mihora et al. ..... 244/204 |
| 6,036,438 | A | * | 3/2000 | Imai ..... 415/192 |

(Continued)

FOREIGN PATENT DOCUMENTS

EP 0 219 140 A2 4/1987

(Continued)

*Primary Examiner* — Christopher Verdier
(74) *Attorney, Agent, or Firm* — Trego, Hines & Ladenheim, PLLC

(57) ABSTRACT

A transonic turbine blade. Expansion waves are generated by a lifting surface on the blade. The expansion waves extend downstream, through a shock generated at the trailing edge of an adjacent blade. The invention increases the strength of the shock, thereby attenuating the expansion waves passing through the shock. One stratagem for increasing the shock is to reduce the aerodynamic load of the trailing edge generating the shock.

10 Claims, 9 Drawing Sheets

U.S. PATENT DOCUMENTS

| | | | | |
|---|---|---|---|---|
| 6,059,532 | A | 5/2000 | Chen et al. | 415/223 A |
| 6,062,819 | A | 5/2000 | Zangeneh et al. | |
| 6,079,948 | A | 6/2000 | Sasaki et al. | |
| 6,203,274 | B1 | 3/2001 | Kikuchi et al. | |
| 6,206,637 | B1 | 3/2001 | Aoki et al. | |
| 6,354,798 | B1 * | 3/2002 | Deckers | 415/192 |
| 6,358,012 | B1 * | 3/2002 | Staubach | 416/228 |
| 6,375,419 | B1 * | 4/2002 | LeJambre et al. | 415/191 |
| 6,375,420 | B1 * | 4/2002 | Tanuma et al. | 415/199.5 |
| 6,431,829 | B1 * | 8/2002 | Watanabe et al. | 415/189 |
| 6,527,510 | B2 * | 3/2003 | Olhofer et al. | 415/191 |
| 2001/0016163 | A1 | 8/2001 | Tomita et al. | |

FOREIGN PATENT DOCUMENTS

| | | |
|---|---|---|
| EP | 1 152 122 A2 | 7/2001 |

* cited by examiner

REDUCED SHOCK TRANSONIC AIRFOIL

Matter enclosed in heavy brackets [ ] appears in the original patent but forms no part of this reissue specification; matter printed in italics indicates the additions made by reissue.

TECHNICAL FIELD

The invention concerns airfoils, such as those used in gas turbines, which operate in a transonic, or supersonic, flow regime, yet produce reduced shocks. One reason for reducing the shocks is that they produce undesirable mechanical stresses in parts of the turbine.

BACKGROUND OF THE INVENTION

A simple analogy will first be given which explains how repeated pressure fluctuations can induce vibration. FIG. 1 shows an acoustic loudspeaker 3 which produces pressure waves 6. Each wave 6 contains a high-pressure, high-density region 9, and a low-pressure, low-density region 12. When the waves 6 strike an object 15, each high-pressure region 9 applies a small force to the object 15, and the succeeding low-pressure region 12 relaxes the force. The sequence of . . . -force-relaxation-force-relaxation- . . .

causes the object 15 to vibrate.

Shocks produced by rotating airfoils can produce similar vibrations, as will now be explained.

FIG. 2 illustrates a generalized shock 23 produced by a generalized airfoil 26. The shocks as drawn in FIG. 2, as well as in FIGS. 3 and 4, are not intended to be precise depictions, but are simplifications, to illustrate the principles under discussion.

One feature of the shock 23 is that the static pressure on side 29 is higher than that on side 32. Another feature is that the gas density on side 29 is higher than on side 32. These differentials in pressure and density can have deleterious effects, as will be explained with reference to FIGS. 3 and 4.

FIG. 3 illustrates a generalized gas turbine 35, which extracts energy from an incoming gas stream 38. Each blade 41 produces a shock 23A in FIG. 4 analogous to shock 23 in FIG. 2. The blades 41 in FIG. 4 collectively produce the shock system, or shock structure, 47.

Similar to the shock 23 in FIG. 2, each individual shock 23A in FIG. 4 is flanked by a differential in pressure and gas density: one side of the shock 23A is characterized by high pressure and high density; the other side is characterized by low pressure and low density.

When the shock structure 47 rotates, as it does in normal operation, it causes a sequence of pressure pulses to be applied to any stationary structure in the vicinity. This sequence of pulses is roughly analogous to the sequence of acoustic pressure waves 6 in FIG. 1.

For example, stationary guide vanes (not shown) are sometimes used to re-direct the gas streams exiting the blades 41 in FIGS. 3 and 4, in order to produce a more favorable angle-of-attack for blades on a downstream turbine (also not shown). The pulsating pressure and density pulses can generate vibration in the stationary guide vanes.

As a general principle, vibration in rotating machinery is to be avoided.

The preceding discussion is a simplification. In general, shocks 23A in FIG. 4 will be accompanied by expansion fans, and the overall aerodynamic structure will be quite complex. Nevertheless, the general principles explained above are still applicable.

SUMMARY OF THE INVENTION

In one form of the invention, substantially all curve on the suction surface of a transonic turbine blade is located upstream of a throat defined by the blade and an adjacent blade. Downstream of the throat, the remaining curve on the suction surface is no more than 6 degrees, and preferably no more than 2 degrees.

DETAILED DESCRIPTION OF THE INVENTION

This discussion will first set forth standard nomenclature, in the context of one form of the invention. It is emphasized that a transonic, or supersonic, structure is under consideration. The term transonic means that the Mach number at some points on a structure is 1.0 or above and, at other points, is below 1.0. The term supersonic means that the Mach number is above 1.0 everywhere, with respect to the structure in question.

Figure 3:
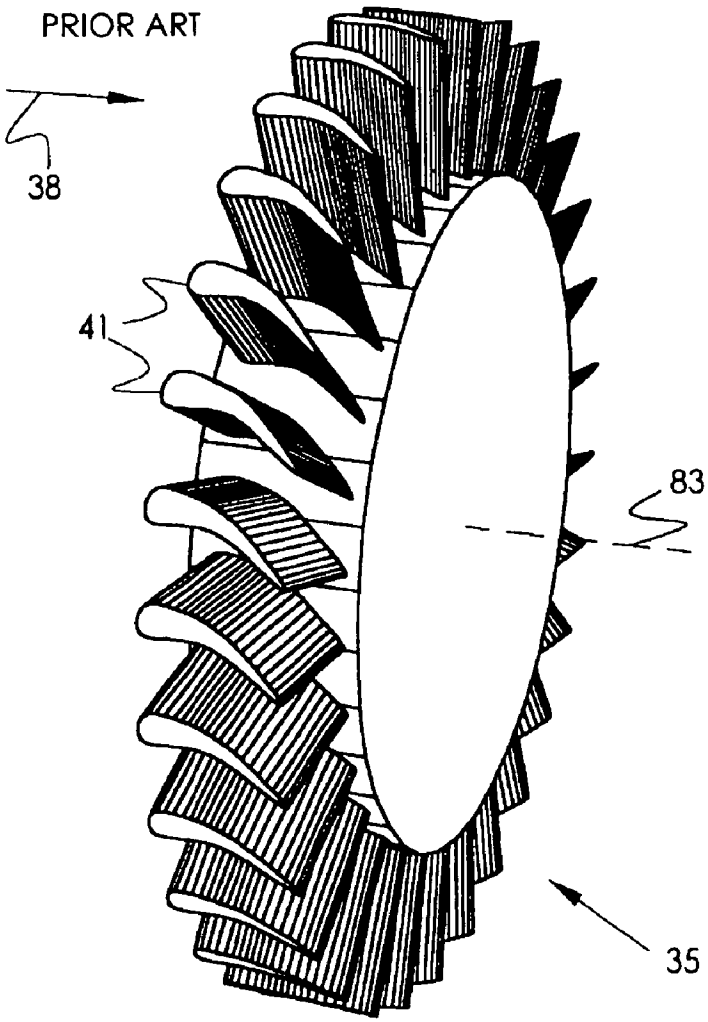
FIG 3 PRIOR ART
FIG. 3 illustrates a generic turbine.
Figure 5:
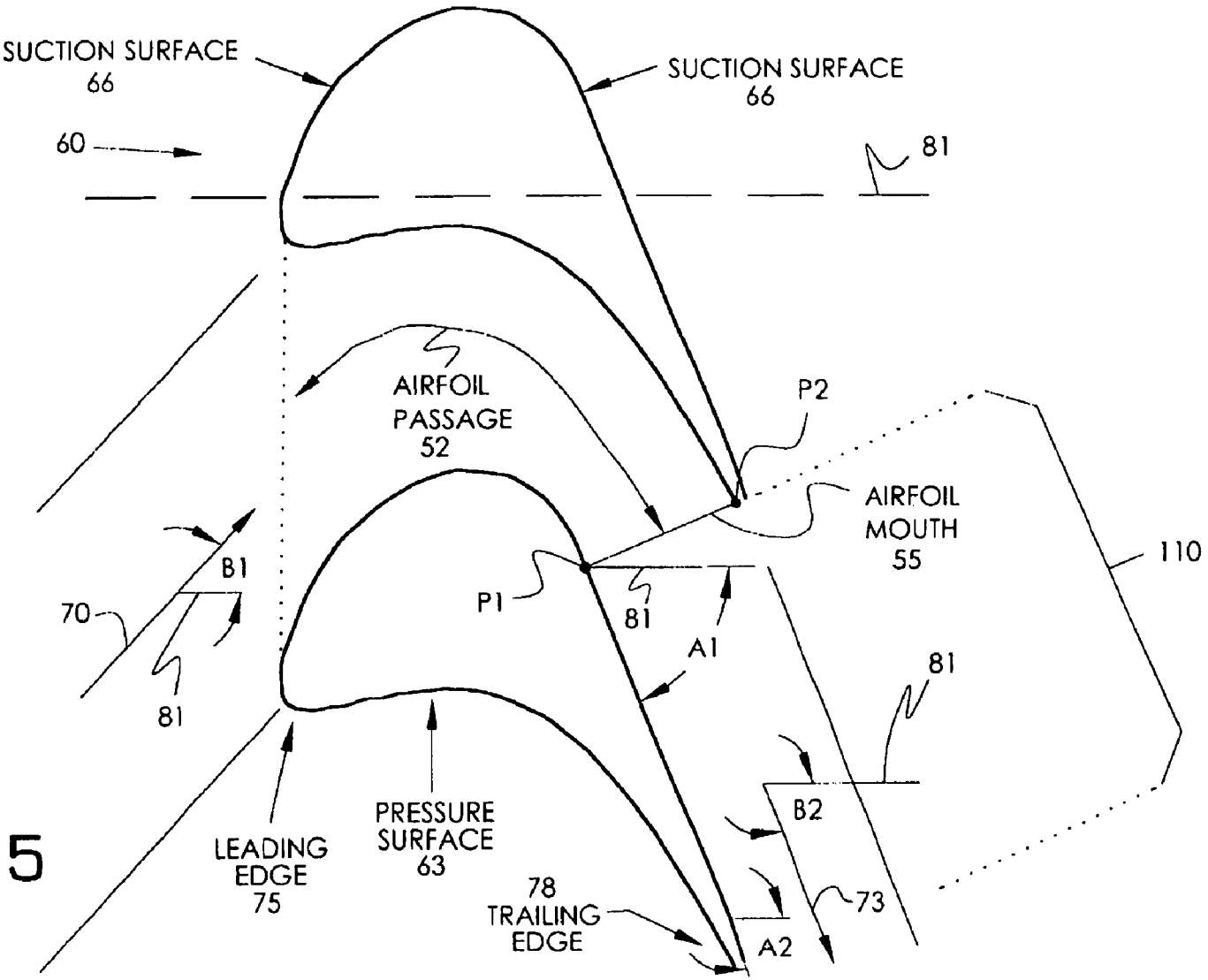
FIG. 5 illustrates one form of the invention.

FIG. 5 is an end-on view of two turbine blades 60 used by the invention. That is, if FIG. 3 showed the invention, then the cross-sections of the blades labeled 41 in FIG. 3 correspond to the cross sections shown in FIG. 5.

In FIG. 5, an airfoil passage 52 is shown, together with an airfoil mouth 55, which is sometimes called a throat. The term airfoil passage is a term of art. That is, even though the region downstream of the airfoil mouth 55 may, from one perspective, also be viewed as a passage, it is not the airfoil passage 52 as herein defined. The airfoil passage 52 herein is bounded by the two blades along its entire length.

Each blade 60 contains a pressure surface, or side, 63 and a suction surface, or side, 66. Arrow 70 represents incoming gas streams while arrow 73 represents exiting gas streams.

Arrow 73 points in the downstream direction. The upstream direction is opposite.

Leading edge 75 is shown, as is trailing edge 78.

Dashed line 81 represents a line parallel to the axis of rotation of the turbine. The axis is labeled 83 in FIG. 3. Line 81 in FIG. 5, and other lines 81 parallel to it, represent reference lines which will be used in defining various angles. In FIG. 5, angle B1 represents the angle between the incoming gas streams 70 and the reference line 81. Angle B1 is called the airfoil inlet gas angle.

Angle B2 represents the angle between the exiting gas streams 73 and the reference line 81. Angle B2 is called the airfoil exit gas angle.

Angle A1 represents the angle between part of the suction surface 66 and the reference line 81. Angle A1 is called the airfoil suction surface metal angle at the airfoil mouth.

Angle A2 represents the angle between part of the suction surface 66 at the trailing edge and the reference line 81. Angle A2 is called the airfoil suction surface metal angle at the airfoil trailing edge.

Against the background of these definitions, four significant characteristics of the system of FIG. 5 can be explained. One characteristic is that no more than two degrees of bending, or curve, occurs in the suction side 66 downstream of the airfoil mouth 55. Data tables and Figures explaining this bending are given below.

The terms bending and curve are considered synonymous, and refer to visible spatial shape. However, they are different from the term curvature, as will be explained later.

This restriction on location of the curve causes substantially all expansion of the transonic airflow to occur upstream of the airfoil mouth 55. Thus, few, if any, expansion waves are generated downstream of the airfoil mouth 55, at least because of the lift-generating process occurring in the airfoil passage. However, as explained below, expansion downstream of the mouth 55 is deliberately generated at a specific point for another purpose.

A second characteristic is a type of corollary to the first, namely, the suction side 66 is substantially flat in region 110, subject to the two-degree bending just described, which is downstream of the airfoil mouth 55. This flatness reduces expansion and shocks, as explained with reference to FIGS. 6 and 7.

Figure 7:
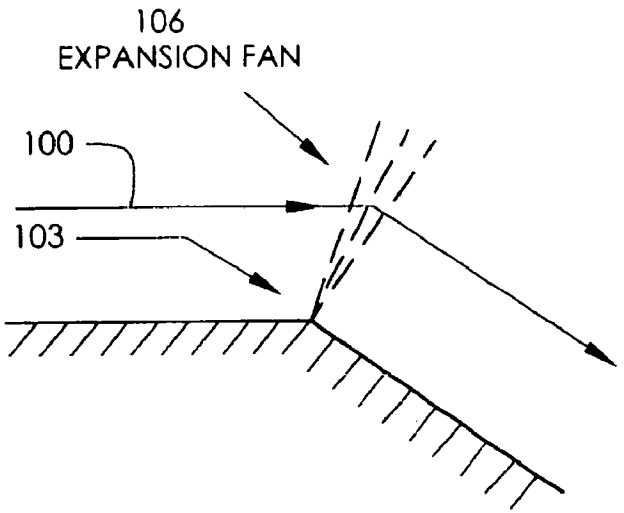
FIG. 7 illustrates formation of an expansion fan.
Figure 6:
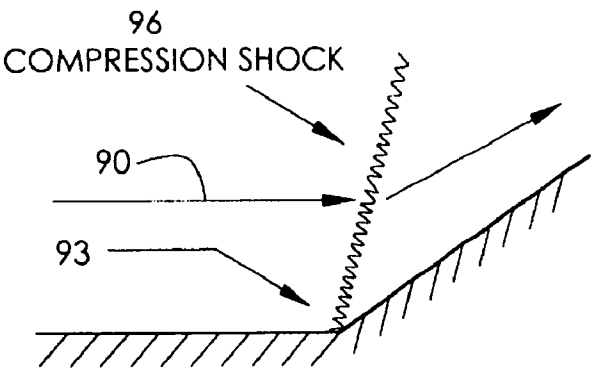
FIG. 6 illustrates formation of a shock.

FIG. 6 illustrates a gas stream 90 encountering a concave corner 93. The compression process induced creates a shock 96. FIG. 7 shows a gas stream 100 encountering a convex corner 103. The expansion process induced creates an expansion fan 106. A characteristic pressure differential and density differential exists across the shock 96 in FIG. 6. The expansion fan 106 is also accompanied by its own type of pressure and density differentials.

In contrast, the flatness, or very shallow bending, of region 110 in FIG. 5 does not create such shocks and expansion fans, or creates them in reduced strengths.

Therefore, considering the first and second characteristics together: the vast majority of shocks and expansions occur in the airfoil passage 52 in FIG. 5, with little or no shocks and expansion generated downstream of the airfoil mouth 55, on surface 110. An exception will be a shock which is deliberately created, and described below.

Figure 8:
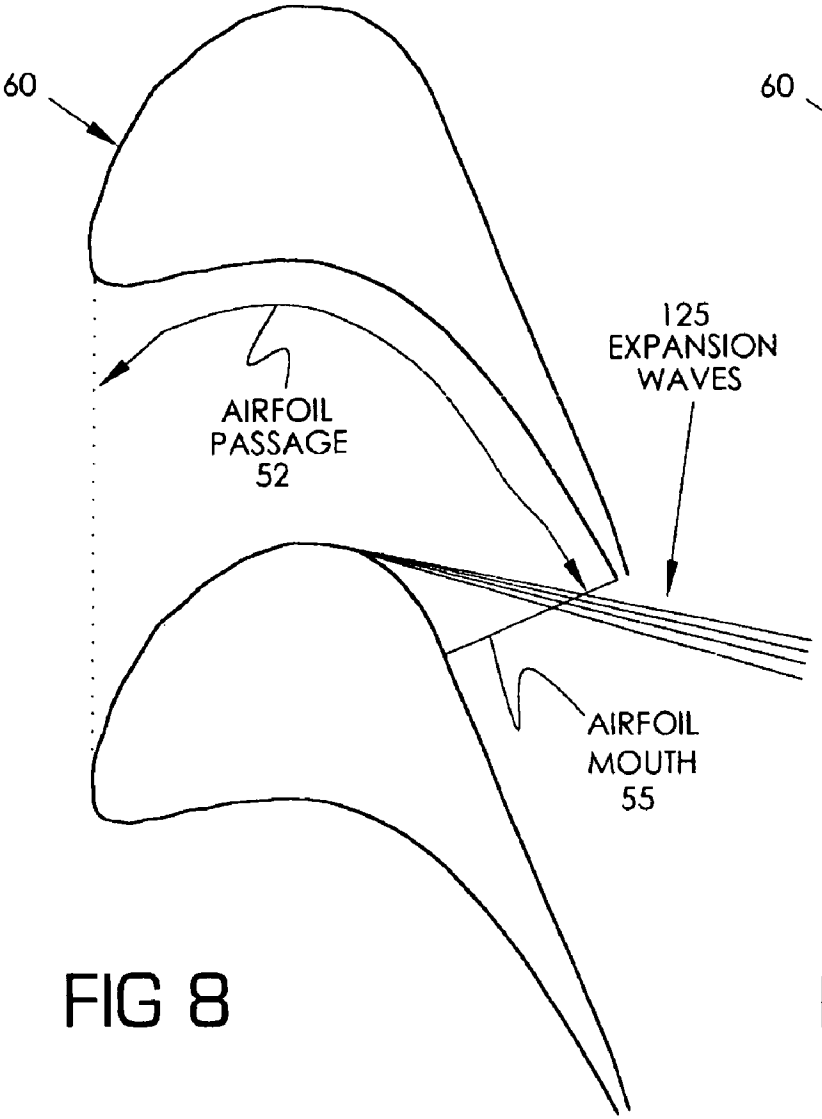

In explaining the third characteristic, the reader is reminded that all, or nearly all, expansion is restricted to the airfoil passage 52. However, the resulting expansion waves, or fan, 125 in FIG. 8 do escape through the airfoil mouth 55, and are not confined to the passage 52.

Figure 9:
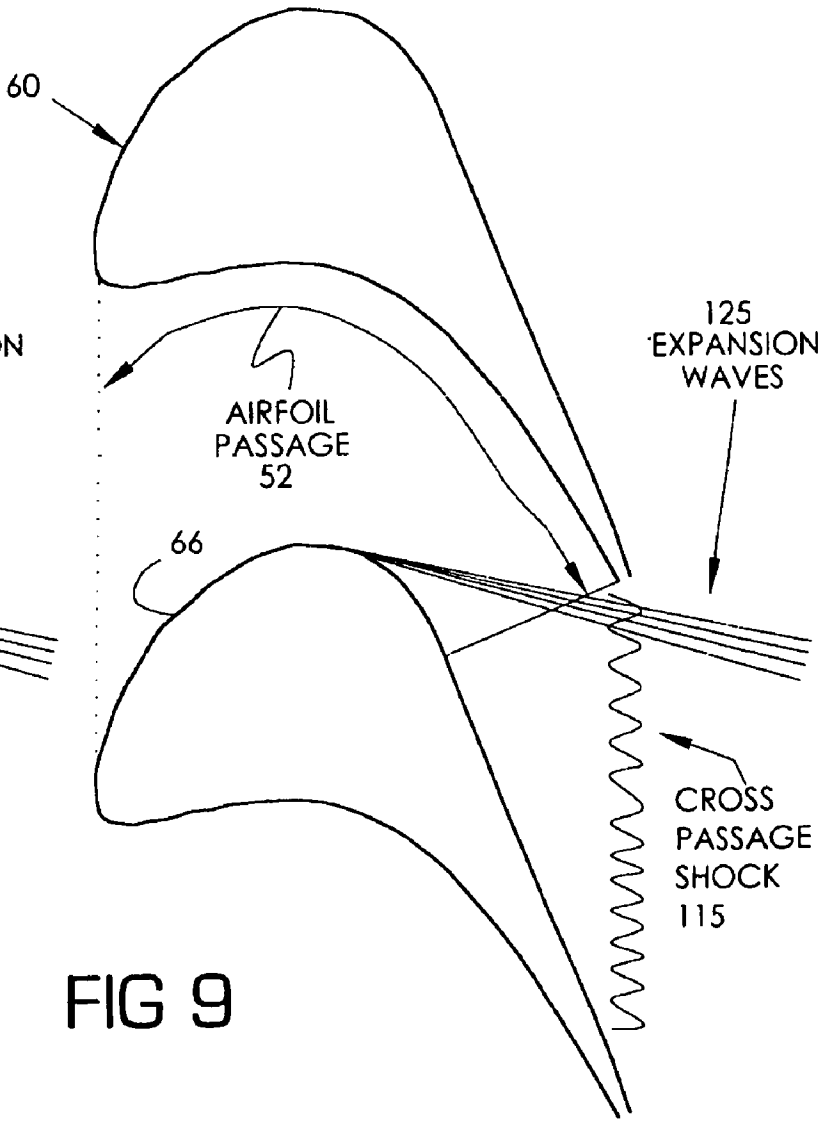
FIGS. 8 and 9 illustrate operation of one form of the invention.

The third characteristic of the invention is that the expansion fan 125 is mitigated by passing it through a shock 115, as indicated in FIG. 9. This particular shock 115 is deliberately increased in strength by the invention, through the particular blade geometries used, which are shown in FIGS. 10-12.

Figure 10:
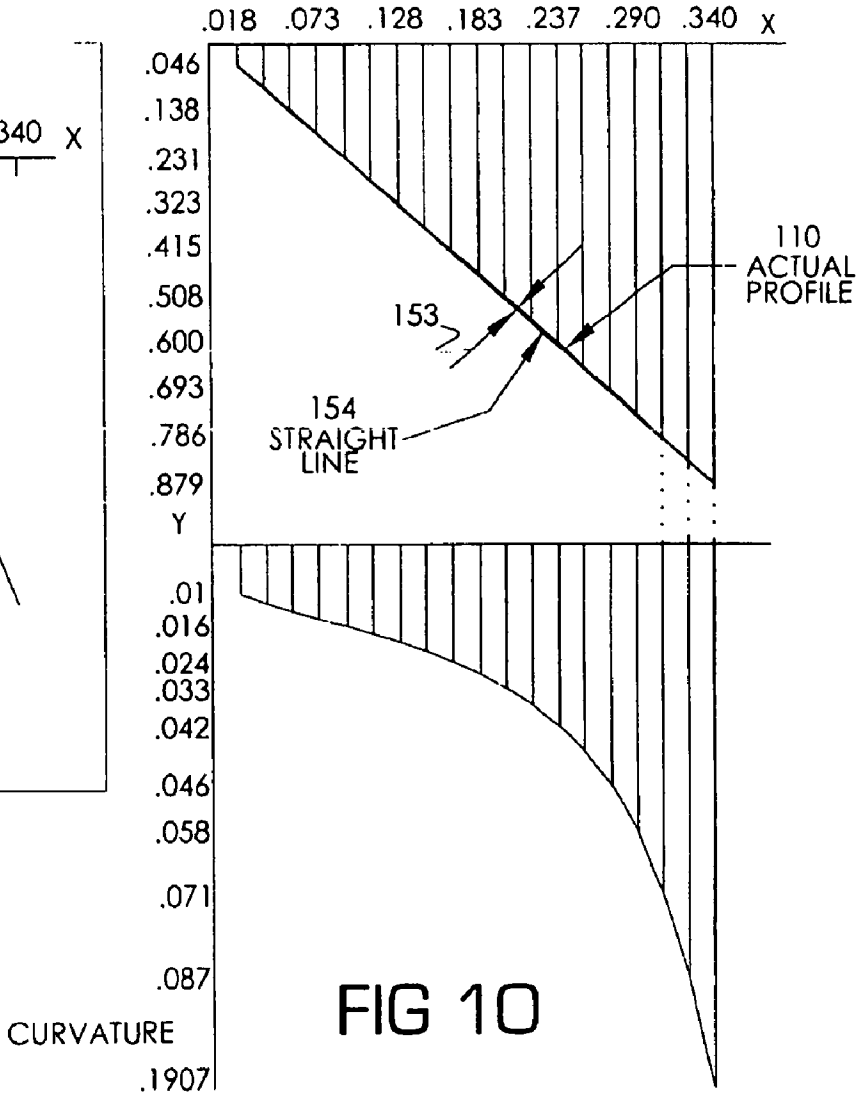
FIGS. 10 and 11 illustrate actual geometry of region 110 in FIG. 5, based on the data contained in Table 1 herein.

FIG. 10, top, is a plot of the actual profile of region 110 of FIG. 5. The x-axis runs parallel to reference line 81 in FIG. 5. Arrows 153 indicate a very small gap between the actual profile 110 and a straight line 154 running from beginning to end of region 110.

The maximum size of this gap is less than 0.005 inches, as the scale of the Figure indicates. For example, the distance between adjacent grid lines of the x-axis is about 0.020 inch. Clearly, the distance 153 is less than one-fourth of 0.020, which is 0.005.

Figure 11:
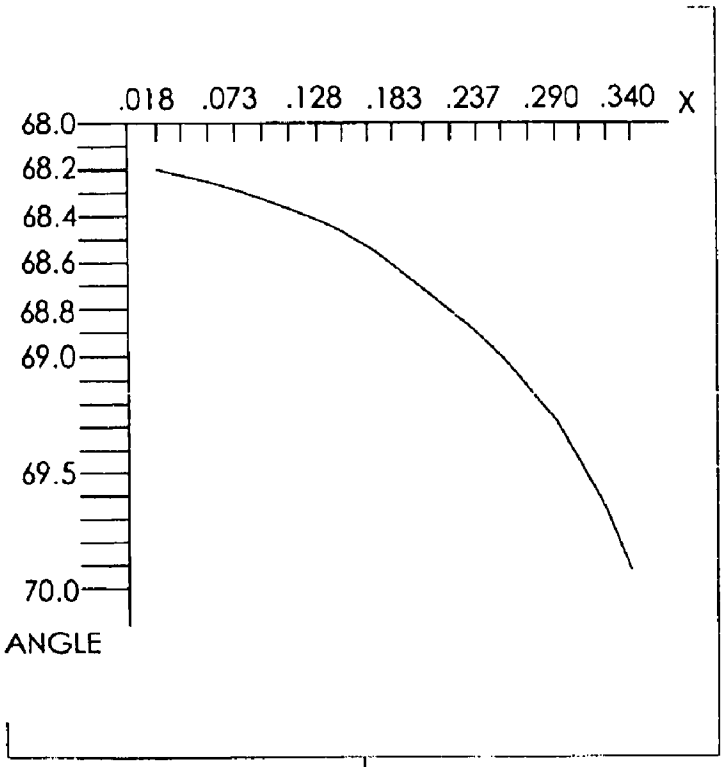
Figure 12:
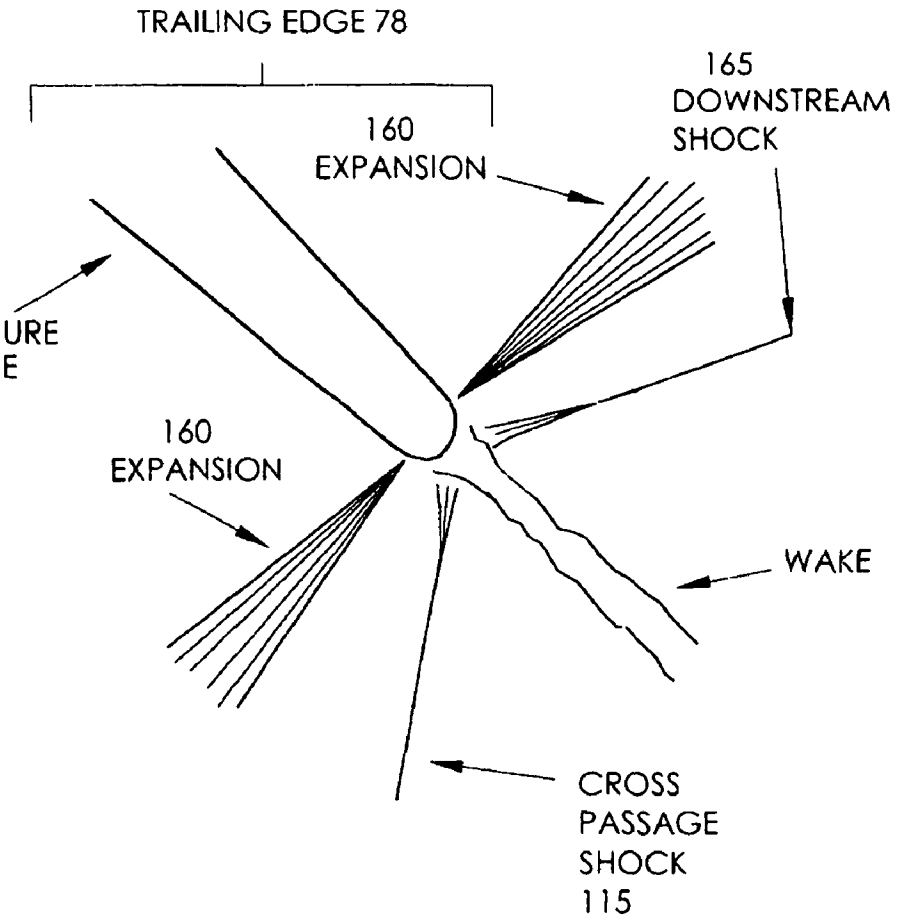
FIGS. 12 and 13 illustrate operation of one form of the invention.

FIG. 11 is a plot of the angle of each point on the surface of region 110, at the corresponding x-positions. Each angle is measured with respect to reference line 81. For example, angle B1 in FIG. 5 would be one of the angles plotted in FIG. 10.

FIG. 10, bottom, is a plot of the curvature of each of the angles, again at the corresponding x-positions of FIG. 10. The term curvature is used in the mathematical sense. It is the first derivative of the change in angle of FIG. 10, with respect to x.

Table 1, below, sets forth data from which region 110 can be constructed. The parameter X in Table 1 is shown in FIGS. 10 and 11. The zero value of X corresponds to the airfoil mouth 55 in FIG. 5. The parameter Y in Table 1 is the y-position shown in FIG. 10. The parameter ANGLE in Table 1 is the angle of FIG. 11. The parameter CURVATURE in Table 1 is the curvature of FIG. 10.

It is emphasized that, depending on the particular orientation selected for the blade, some coordinates can be considered negative. For example, by one convention, the parameter Y in FIG. 10 can be considered negative. Selection of a coordinate system, and specification of the negative axes, are both considered the designer's choice. For simplicity, algebraic sign of the axes are ignored here.

TABLE 1

| X | Y | ANGLE | CURVATURE |
|---|---|---|---|
| −.200386E−07 | .173349E−08 | 68.1985 | .778938E−02 |
| .366203E−02 | .922460E−01 | 68.2030 | .824942E−02 |
| .732402E−02 | .184488E−01 | 68.2077 | .869913E−02 |
| .109870E−01 | .276729E−01 | 68.2127 | .913866E−02 |
| .146500E−01 | .368968E−01 | 68.2178 | .956786E−02 |
| .183130E−01 | .461206E−01 | 68.2231 | .998673E−02 |
| .219770E−01 | .553441E−01 | 68.2285 | .103954E−01 |
| .256410E−01 | .645675E−01 | 68.2342 | .107937E−01 |
| .293060E−01 | .737909E−01 | 68.2400 | .111819E−01 |
| .329700R−01 | .830142E−01 | 68.2461 | .115595E−01 |
| .366350E−01 | .922374E−01 | 68.2523 | .119270E−01 |
| .403000E−01 | .101461 | 68.2587 | .122608E−01 |
| .439640E−01 | .110684 | 68.2654 | .125827E−01 |
| .476290E−01 | .119907 | 68.2722 | .129006E−01 |
| .512930E−01 | .129130 | 68.2792 | .132143E−01 |
| .549590E−01 | .138354 | 68.2863 | .135239E−01 |
| .586230E−01 | .147577 | 68.2937 | .138829E−01 |
| .622870E−01 | .156801 | 68.3012 | .141305E−01 |
| .659500E−01 | .166025 | 68.3089 | .144274E−01 |
| .696130e_01 | .175249 | 68.3167 | .147202E−01 |
| .732760E−01 | .184473 | 68.3248 | .150089E−01 |
| .769380E−01 | .193697 | 68.3330 | .152955E−01 |
| .805990E−01 | .202922 | 68.3412 | .155901E−01 |
| .842590E−01 | .212146 | 68.3497 | .158887E−01 |
| .879190E−01 | .221371 | 68.3583 | .161914E−01 |
| .915790E−01 | .230598 | 68.3671 | .164981E−01 |
| .952380E−01 | .239823 | 68.3761 | .168088E−01 |

TABLE 1-continued

| X | Y | ANGLE | CURVATURE |
|---|---|---|---|
| .988950E−01 | .249049 | 68.3852 | .171234E−01 |
| .102551 | .258276 | 68.3945 | .174420E−01 |
| .106208 | .267502 | 68.4041 | .177647E−01 |
| .109862 | .276729 | 68.4137 | .180913E−01 |
| .113516 | .285957 | 68.4236 | .184219E−01 |
| .117168 | .295186 | 68.4336 | .187553E−01 |
| .120820 | .304414 | 68.4437 | .190925E−01 |
| .124469 | .313643 | 68.4541 | .194397E−01 |
| .123118 | .322873 | 68.4647 | .197970E−01 |
| .131766 | .332103 | 68.4754 | .201641E−01 |
| .136412 | .341333 | 68.4864 | .205413E−01 |
| .139056 | .350565 | 68.4977 | .209283E−01 |
| .142699 | .359796 | 68.5091 | .213253E−01 |
| .146339 | .369030 | 68.5208 | .217322E−01 |
| .149979 | .378262 | 68.5326 | .221490E−01 |
| .153617 | .387497 | 68.5447 | .225756E−01 |
| .157252 | .396731 | 68.5570 | .230120E−01 |
| .160887 | .405966 | 68.5694 | .234455E−01 |
| .164519 | .415202 | 68.5821 | .238942E−01 |
| .168150 | .424439 | 68.5950 | .243619E−01 |
| .171778 | .433677 | 68.6083 | .248486E−01 |
| .175404 | .442916 | 68.6219 | .253544E−01 |
| .179028 | .452154 | 68.6358 | .258791E−01 |
| .182650 | .461395 | 68.6500 | .264228E−01 |
| .186268 | .470636 | 68.6645 | .269853E−01 |
| .189886 | .479878 | 68.6793 | .275668E−01 |
| .193500 | .489121 | 68.6944 | .2S1669E−01 |
| .197112 | .498365 | 68.7098 | .287857E−01 |
| .200722 | .507610 | 68.7254 | .294135E−01 |
| .204328 | .516857 | 68.7410 | .300184E−01 |
| .207932 | .526104 | 68.7571 | .306628E−01 |
| .211534 | .535352 | 68.7738 | .313468E−01 |
| .215131 | .544602 | 68.7908 | .320698E−01 |
| .218727 | .553852 | 68.8084 | .328322E−01 |
| .222319 | .563103 | 68.8265 | .336337E−01 |
| .225908 | .572356 | 68.8451 | .344740E−01 |
| .229494 | .581611 | 68.8642 | .353532E−01 |
| .233076 | .590866 | 68.8838 | .362709E−01 |
| .236655 | .600123 | 68.9038 | .372274E−01 |
| .240231 | .609381 | 68.9244 | .382222E−01 |
| .243802 | .618641 | 68.9454 | .392550E−01 |
| .247370 | .627902 | 68.9657 | .401391E−01 |
| .250935 | .637165 | 68.9867 | .410925E−01 |
| .254494 | .646429 | 69.0087 | .421442E−01 |
| .258050 | .655694 | 69.0316 | .432935E−01 |
| .261603 | .664961 | 69.0554 | .445401E−01 |
| .265151 | .674231 | 69.0802 | .458863E−01 |
| .268693 | .638501 | 69.1058 | .473232E−01 |
| .272233 | .692771 | 69.1324 | .488594E−01 |
| .275767 | .702047 | 69.1599 | .504911E−01 |
| .279296 | .711323 | 69.1883 | .522176E−01 |
| .282821 | .720601 | 69.2176 | .540392E−01 |
| .286340 | .729881 | 69.2478 | .559548E−01 |
| .289853 | .739162 | 69.2789 | .579636E−01 |
| .293362 | .748466 | 69.3121 | .602168E−01 |
| .296866 | .757731 | 693467 | .626344E−01 |
| .300363 | .767020 | 693825 | .652012E−01 |
| .303858 | .776310 | 69.4196 | .679173E−01 |
| .307338 | .785603 | 69.4580 | .707810E−01 |
| .310818 | .794898 | 69.4975 | .737916E−01 |
| .314288 | .804195 | 69.5383 | .769482E−01 |
| .317758 | .813495 | 69.5803 | .802490E−01 |
| .321218 | .822797 | 69.6235 | .836951E−01 |
| .324668 | .832101 | 69.6679 | .872825E−01 |
| .328118 | .841408 | 69.7135 | .910113E−01 |
| .331558 | .850719 | 69.7602 | .948816E−01 |
| .334988 | .860033 | 69.8081 | .988903E−01 |
| .338408 | .869349 | 69.8614 | .103796 |
| .341818 | .878668 | 69.9208 | .109721 |
| .345218 | .887990 | 69.9824 | .115984 |
| .348618 | .897316 | 70.0462 | .122585 |
| .352008 | .906645 | 70.1123 | .129518 |
| .355378 | .915978 | 70.1806 | .136781 |

FIGS. 10 and 11 are simplified plots of the data of Table 1: every tenth data point in the Table is plotted in those Figures.

Some significant features of FIGS. 10 and 11 are the following. As FIG. 10 indicates, region 110 is substantially flat. Distance 153 is less than 0.005 inch.

As FIG. 11 indicates, the angle of the surface of region 110 continually increases as one progresses downstream. The tables of FIG. [14] *11* indicate that the angle changes from an absolute value of 68.1985, at the airfoil mouth 55 of FIG. 5, to an absolute value of 70.1806 at the trailing edge 78. The difference between these two angles is 1.9821, or less than to the two degrees stated above.

As FIG. 10 indicates, the curvature progressively, monotonically, increases from the mouth 55 to the trailing edge 78. Restated, the rate of change of the angle increases from the mouth 55 to the trailing edge 78.

The effects of this geometry on the strength of the cross passage shock 115 in FIG. 9 will now be explained. FIG. 12 illustrates a generalized trailing edge 78, and the cross-passage shock 115 generated, which is also shown in FIG. 9. Expansion fans 160 are shown in FIG. 12, as is the downstream shock 165.

Figure 13:
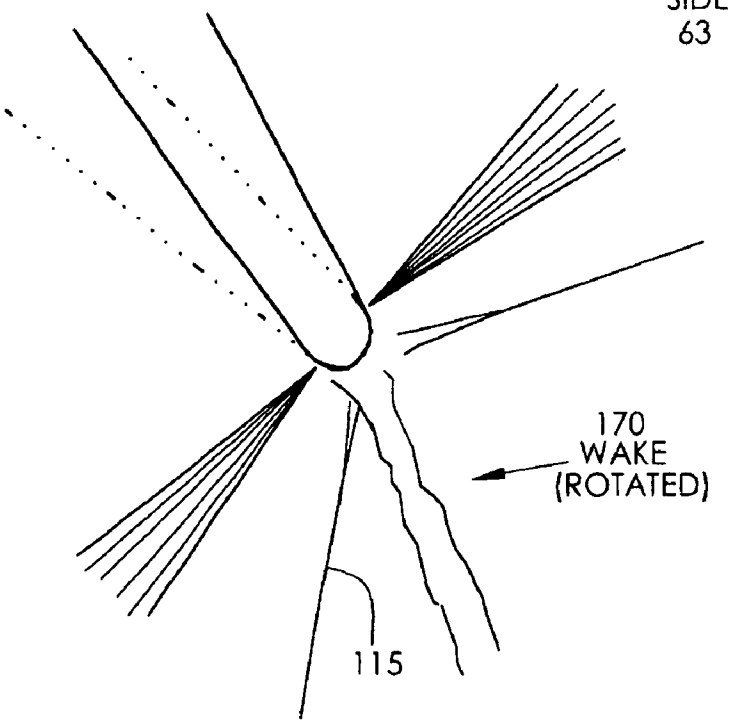

FIG. 13 also illustrates the trailing edge, but rotated clockwise. The rotated condition tends to unload the aerodynamic loading at the trailing edge 78. That is, the static pressure on the pressure side is reduced, and that on the suction side increases. The unloading can be sufficiently great that negative lift is attained at the trailing edge.

The reduction in loading causes the wake 170 to rotate toward the pressure side 63, as indicated by a comparison of FIGS. 12 and 13. This situation causes the cross-passage shock 115 in FIG. 13 to increase in intensity. One way to understand this is to view the wake 170 as a physical barrier. The pressure side 63 in FIG. 13, together with the wake 170, act as the convex corner 93 in FIG. 6, forcing flow moving in the downstream direction on the pressure side 63 in FIG. 13 to bend. This action increases the cross-passage shock 115.

When the expansion waves, or fan, 125 in FIG. 9 now cross the strengthened cross-passage shock 115, their strength is thereby reduced.

The invention produces a specific favorable pressure ratio. Two pressures are measured in a specific plane 190, shown in FIG. 14. Points P8 and P9 represent two points at which the pressures are measured. The Figure does not indicate the precise locations of points P8 and P9, but merely indicates that two separate locations are involved.

Points P8 and P9 lie in plane 190, which is parallel with plane 195, which contains the tips of the trailing edges of the blades 60. Plane 190 is located downstream from the trailing edge at a distance of 50 percent of the chord of the blade. A chord is indicated, as is the 50 percent distance. This plane will be defined as a 50 percent chord plane.

One pressure measured at point P8 or P9 is the cross-passage maximum static pressure, PSMAX. It will be the maximum pressure in plane 190. The other pressure is the minimum static pressure, PSMIN, in plane 190. Of course, the flow field in crossing plane 190 will be axi-symmetric, so that numerous comparable pairs of points P8 and P9 will exist.

The ratio of PSMAX/PSMIN is preferably in the range of 1.35 or less.

The two points P8 and P9 should be located at comparable aerodynamic stations. For example, if P8 were located at the radial tip of a blade, and P9 located at a blade root, the stations would probably not be comparable. In contrast, if both points were located at the same radius from the axis of rotation 83 in FIG. 3, then the stations would be comparable.

Figure 15:
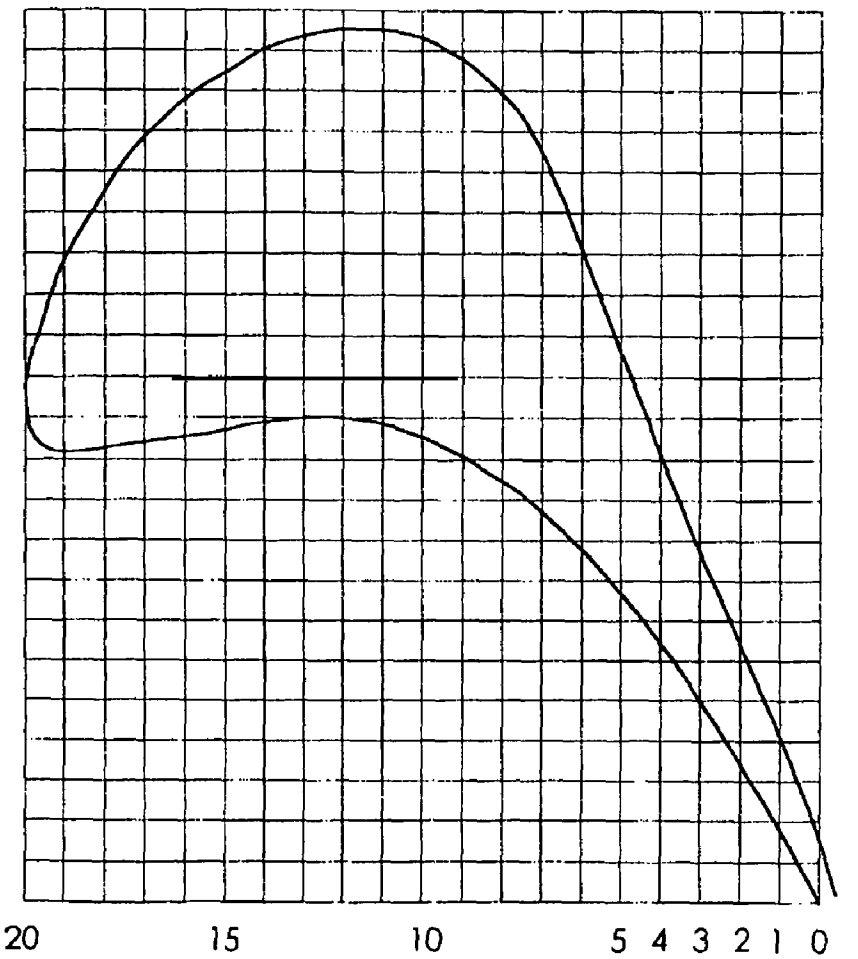
FIG. 15 is a cross section of one form of the invention.

FIG. 15 is a scale representation of the airfoil used in one form of the invention, drawn in arbitrary units. The curve shown in FIG. 15 is a Nonuniform Rational B-Spline, NURB, based on the data points given in Table 2, below.

TABLE 2

| | |
|---|---|
| 7.7163, | 1.8954 |
| 7.6828, | 1.9543 |
| 7.6180, | 2.0734 |
| 7.5245, | 2.2489 |
| 7.4214, | 2.4134 |
| 7.3254, | 2.5752 |
| 7.2253, | 2.7329 |
| 7.1254, | 2.8979 |
| 7.0121, | 3.0626 |
| 6.9058, | 3.2339 |
| 6.7832, | 3.3863 |
| 6.6802, | 3.5329 |
| 7.7163, | 1.8954 |
| 7.6828, | 1.9543 |
| 7.6180, | 2.0734 |
| 7.5245, | 2.2489 |
| 7.4214, | 2.4134 |
| 7.3254, | 2.5752 |
| 7.2253, | 2.7329 |
| 7.1254, | 2.8979 |
| 7.0121, | 3.0626 |
| 6.9058, | 3.2339 |
| 6.7832, | 3.3863 |
| 6.6802, | 3.5329 |
| 6.5663, | 3.6569 |
| 6.4684, | 3.7721 |
| 6.3710, | 3.8791 |
| 6.2364, | 4.0066 |
| 6.1067, | 4.1308 |
| 5.9745, | 4.2366 |
| 5.8403, | 4.3156 |
| 5.7064, | 4.4096 |
| 5.5550, | 4.4789 |
| 5.4433, | 4.5390 |
| 5.3206, | 4.5694 |
| 5.2113, | 4.6119 |
| 5.0677, | 4.6314 |
| 4.9297, | 4.6425 |
| 4.7838, | 4.6445 |
| 4.6681, | 4.6305 |
| 4.5483, | 4.6213 |
| 4.4289, | 4.6078 |
| 4.2891, | 4.5737 |
| 4.1707, | 4.5483 |
| 4.0181, | 4.5363 |
| 3.8978, | 4.5203 |
| 3.7512, | 4.4946 |
| 3.6176, | 4.4838 |
| 3.4829, | 4.4488 |
| 3.3792, | 4.4507 |
| 3.2830, | 4.4537 |
| 3.1952, | 4.5154 |
| 3.1517, | 4.6155 |
| 3.1511, | 4.7069 |
| 3.1376, | 4.8406 |
| 3.1744, | 4.9832 |
| 3.2312, | 5.1436 |
| 3.2768, | 5.2709 |
| 3.3182, | 5.4008 |
| 3.4245, | 5.6331 |
| 3.5836, | 5.8789 |
| 3.7415, | 6.1244 |
| 3.8531, | 6.2258 |
| 3.9583, | 6.3401 |
| 4.1046, | 6.4671 |
| 4.2760, | 6.5598 |
| 4.3914, | 6.6317 |
| 4.4867, | 6.7002 |
| 4.6281, | 6.7481 |
| 4.7655, | 6.7887 |
| 4.9090, | 6.8189 |
| 5.0335, | 6.8182 |
| 5.1667, | 6.8215 |
| 5.3104, | 6.8064 |
| 5.4688, | 6.7648 |
| 5.6281, | 6.6695 |

TABLE 2-continued

| | |
|---|---|
| 5.7941, | 6.5483 |
| 5.9350, | 6.4081 |
| 6.0845, | 6.2080 |
| 6.2110, | 5.9138 |
| 6.3761, | 5.4967 |
| 6.6476, | 4.8322 |
| 7.1107, | 3.6282 |
| 7.6142, | 2.6276 |
| 7.8135, | 1.9386 |

The following discussion will consider (1) various characterizations of the invention, and (2) definitional matters.

As shown in FIG. 5, the suction side 66 can be divided into (1) a lift region within the airfoil passage 52 containing substantially all bending of the suction side, (2) a trailing region 110 which contains no more than two degrees of bending, and which is entirely located downstream of the airfoil mouth 55 in FIG. 5.

The trailing edge 78 of the suction side 66 has greater camber than does the suction side at the airfoil mouth. Camber angle is a term of art, and is defined, for example, in chapter 5 of the text GAS TURBINE THEORY by Cohen, Rogers, and Saravanamuttoo (Longman Scientific & Technical Publishing, 1972, ISBN 0-470-20705-1).

In FIG. 5, as one progresses in the downstream direction, that is, in the direction of arrow 60, the bending of the surface 110 causes the surface 110 to move away from the axial direction, represented by line 81. That is, the angle of surface 110 progressively increases, as indicated by FIG. 11. Further, the mathematical curvature, or first derivative, of the angle, also progressively increases in the downstream direction.

The increase just described causes the surface of the suction side 66 to move away from the axial direction and toward the transverse direction.

The meaning of the term angle should be explained. FIG. 11 gives the angle in terms of the slope of the region 110 at each x-position. The slope is a ratio, which is non-dimensional for the top of FIG. 10: inches/inches. If the actual angle in degrees or radians is desired, the arctangent of the given angle/slope should be taken.

As stated, the angle/slope of FIG. 11 is the first derivative of Y in FIG. 10, top, with respect to X. The curvature of FIG. 10, bottom, is the second derivative of Y with respect to X, which is equivalent to the first derivative of the angle/slope.

One form of the invention comprises a row of turbine blades, which may be supported by a rotor. FIG. 3 illustrates a row of turbine blades on a rotor. In the turbine art, even though the array of turbine blades is a circumferential array in FIG. 3, supported by a turbine disc, the array is traditionally called a row. Also, in cascade testing, a literal row of turbine blades is used.

Each pair of blades, as in FIG. 5, defines an airfoil passage 52, and an airfoil mouth 55, through which gases travelling through the passage 52 pass, when exiting the passage 52. Expansion waves 125 in FIG. 9 emanate from the suction surface 66, and pass through a cross-passage shock 115. The invention provides a means, or method, for increasing the strength of that cross-passage shock 115.

It is recognized in the art how to derive a mean, or representative, gas stream 73 in FIG. 5. One approach is to simply draw a line perpendicular to the airfoil mouth 55. Another is to take a mean vector representing all flow vectors exiting the mouth 55.

Another form of the invention can be viewed as a transonic turbine blade equipped with means for aerodynamically unloading its trailing edge. The curvature of FIG. 10 provides an example of such a means.

Angle A2 in FIG. 5 is greater than angle B2, but no more than five degrees greater.

Angle A1 in FIG. 5 is either (1) less than angle B2, but no more than five degrees less, or (2) more than B2, but no more than five degrees more.

Figure 16:
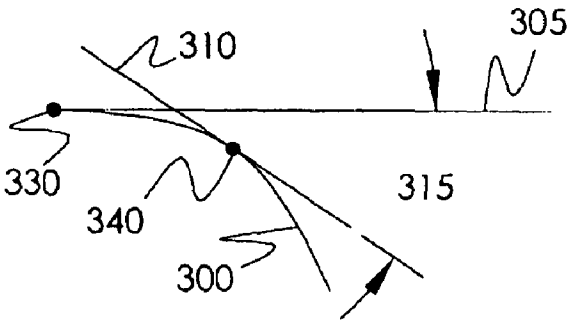
FIG. 16 illustrates how amount of bending of a surface can be numerically defined.

As to the term bending, the amount of bending between two points on a curved surface can be defined as the angle made by two tangents at the two respective points. For example, FIG. 16 shows a curve 300, and two tangents 305 and 310. The amount of bending between the two tangent points 330 and 340 equals angle 315. As another example, the amount of bending of a cylinder between the 12 o'clock position and the 3 o'clock position would be 90 degrees. This definition may not apply if an inflection point occurs between the points.

The invention has particular application in a transonic turbine. A transonic turbine is characterized by its design to extract as much energy as possible from a moving gas stream, yet use the smallest number possible of turbine stages and airfoils.

Figure 17:
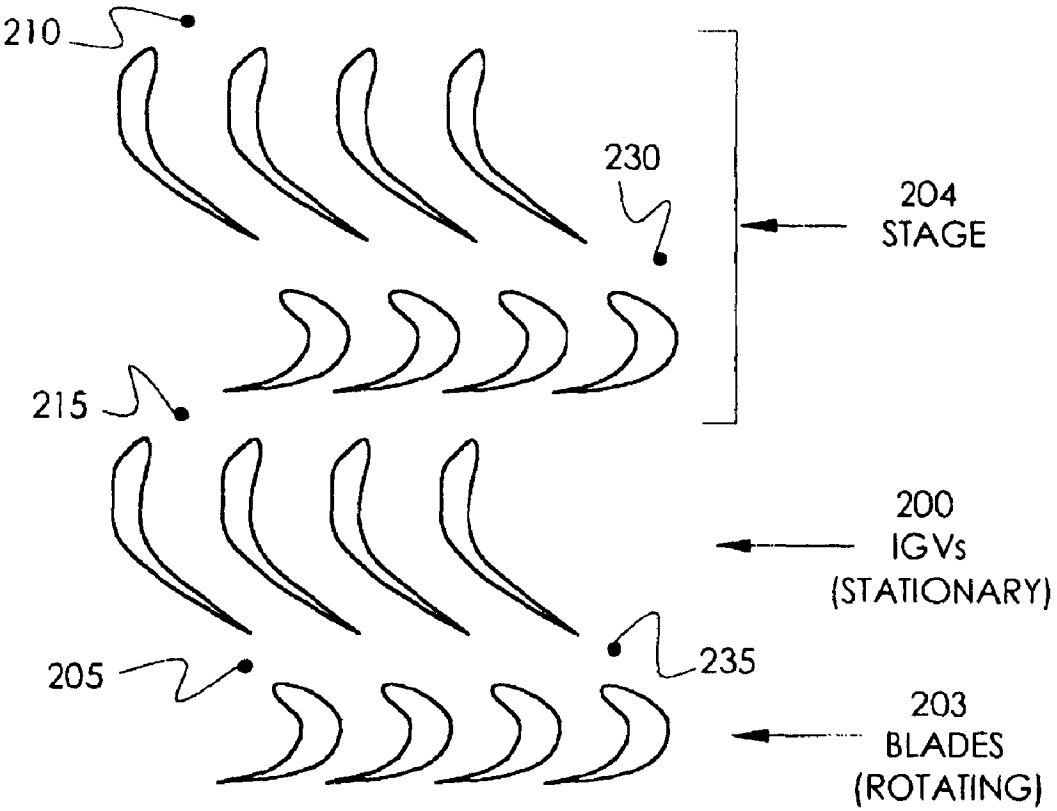
FIG. 17 is a schematic cross-sectional view of blades and Inlet Guide Vanes, IGVs, in a gas turbine engine.

A turbine stage is defined as a pair of elements, namely, a (1) set of stationary inlet guide vanes, IGVs, and (2) a row of rotating turbine blades. FIG. 17 represents two stages.

For a single turbine stage 204, the level of energy extraction can be defined as a normalized amount of energy, which equals the amount of energy extracted by the stage, in BTU's, British Thermal Units, per pound of gas flow divided by the absolute total temperature at the vane exit, such as at point 205 in FIG. 17. That is, the quantity computed is BTU/(lbm*R), wherein BTU represents energy extracted per stage, lbm is mass flow of gas in pounds per second, and R is temperature on the Rankine scale.

In one form of the invention, this quantity lies in the range of 0.0725 to 0.0800 for a single stage. The principles of the invention apply to turbines operating in this range, and above.

Another measure of the type of environment in which the invention operates is indicated by the ratio of two absolute pressures. The ratio is that between (1) the absolute pressure at the inlet to a stage, at point 210 in FIG. 17, to (2) the absolute pressure at the outlet of a stage, at point 215. In one form of the invention, this ratio lies in the range of 3.5 to 5.0.

A third measure of the type of environment in which the invention operates is indicated by the pressure ratio across a blade, as opposed to that across a stage. Under one form of the invention, the ratio of (1) the total pressure at a blade inlet, at point 230 in FIG. 17, to (2) the static pressure at the airfoil (or blade) exit, at point 215, lies in the range of 2.3 to 3.0.

It was stated above that the amount of bending between the mouth and trailing edge should be limited to two degrees. However, in other embodiments, bending as great as six degrees is possible.

Figure 1:
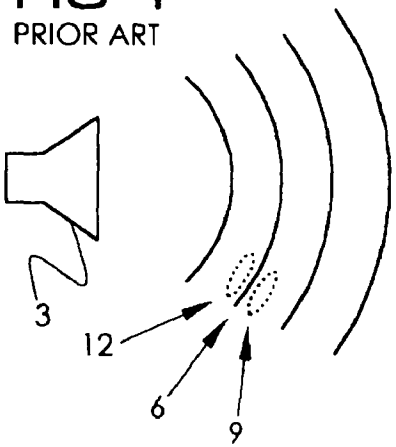
FIG 1 PRIOR ART
FIG. 1 illustrates acoustic waves 6 impinging on an object 15.
Figure 2:
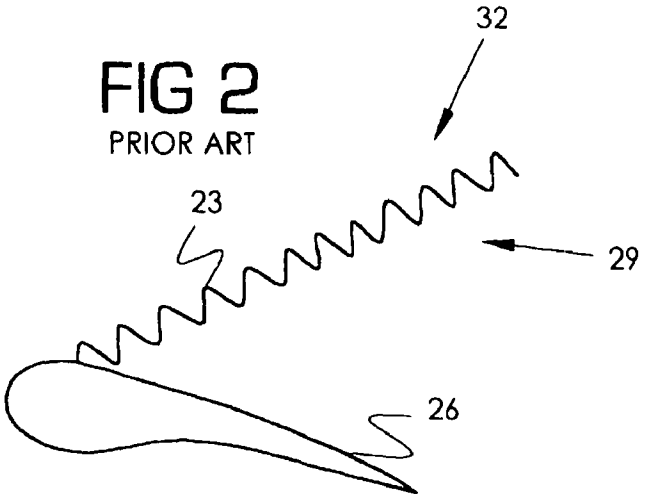
FIG 2 PRIOR ART
FIG. 2 illustrates a generalized shock 23.
Figure 18:
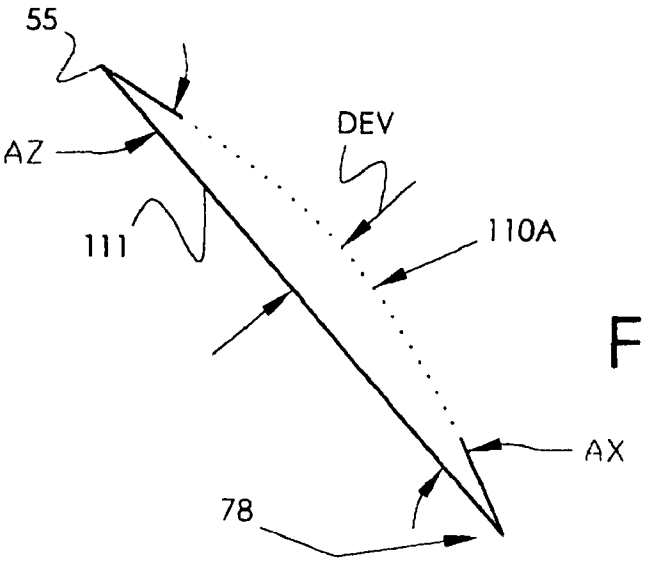
FIG. 18 illustrates how a maximum allowable deviation DEV from flatness can be computed.
Figure 4:
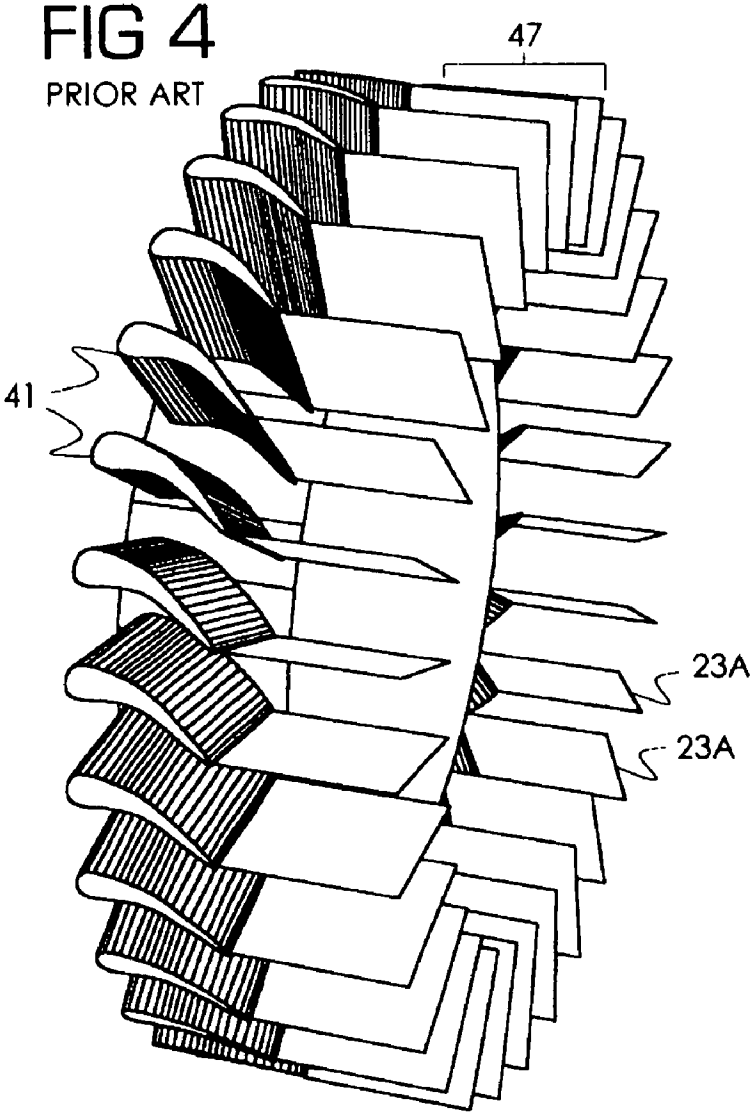
FIG 4 PRIOR ART
FIG. 4 illustrates shocks 23A produced by the turbine of FIG. 3.

The discussion above placed a limit of 0.005 inch on dimension 153 in FIG. 10. In another form of the invention, the limit can be computed in a different manner. FIG. 18 illustrates region 110, which can correspond to region 110 in FIG. 5, or can represent a comparable surface, running from blade mouth to trailing edge, on a larger blade, such as one used in a steam turbine.

In one form of the invention, a limit of six degrees is placed on both angles AX and AZ in FIG. 18. Surface 111 is flat. Region 110 of FIG. 5 must occupy the envelope between dashed surface 110 A and surface 111.

Given these limits of six degrees, the maximum value of the deviation DEV from surface 111 is (LENGTH_11½) TAN 6, wherein LENGTH_110 is the length of surface 110. If, as in Table 1, LENGTH_110 is about ⅓ inch, then the maximum value of DEV is 0.0175. If, in a longer blade, LENGTH_111 is 1.5 inches, then the maximum value of DEV is 0.079 inch.

The surface 110 within envelope 110A may be rippled, or wavy, but must still lie within the envelope determined by parameter DEV.

The limits just stated were for angles of six degrees. Other forms of the invention implement the same type of limit, but for different angles. Angles AX and AZ of 0.5, 1.0, 1.5, 2.0, 2.5, 3.0, 3.5, 4.0, 4.5, 5.0, 5.5, and 6.0 degrees are included. For example, a particular blade may impose a limit on DEV based on a three degree limit. The limit on DEV accordingly is (LENGTH_11½) TAN 3. If LENGTH_111 is ⅓ inch, then the limit on DEV is 0.0087 inch.

The general form of the limit is (LENGTH_11½)TANx, wherein x is one of the angles in the series specified in the previous paragraph, running from 0.5 to 6.0.

Figure 19:
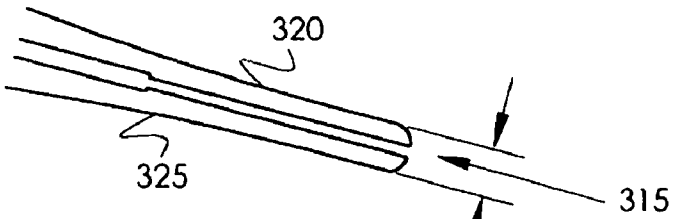
FIG 19 PRIOR ART
FIG. 19 illustrates a trailing edge of a turbine blade found in the prior art.
Figure 14:
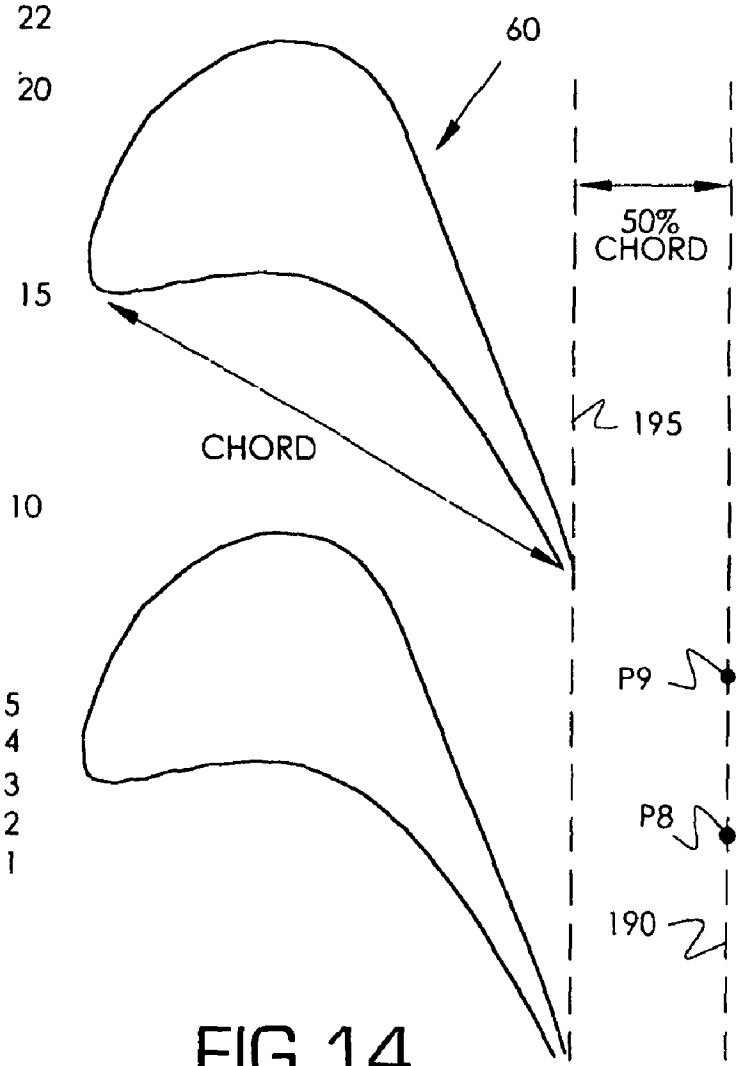
FIG. 14 illustrates a definition of a fifty-percent-chord-plane, and points at which pressure is measured in that plane.

FIG. 19 illustrates the trailing edge of a turbine blade found in the prior art, having a thickness of 0.050 inch, as indicated. The blade in question provided the desirable pressure ratio PSMAX/PSMIN of 1.35 in the 50 percent chord plane of FIG. 14. This ratio was discussed above. However, that blade is believed to provide an unfavorable efficiency, as indicated by total pressure loss. Under the invention, cascade testing indicates that total pressure loss at the 50 percent chord plane of FIG. 14 is 3.75 percent. This testing was done on a 1.5 scale airfoil of the type shown in FIG. 20, using trailing edge cooling, at a total static pressure ratio of 2.8.

Figure 20:
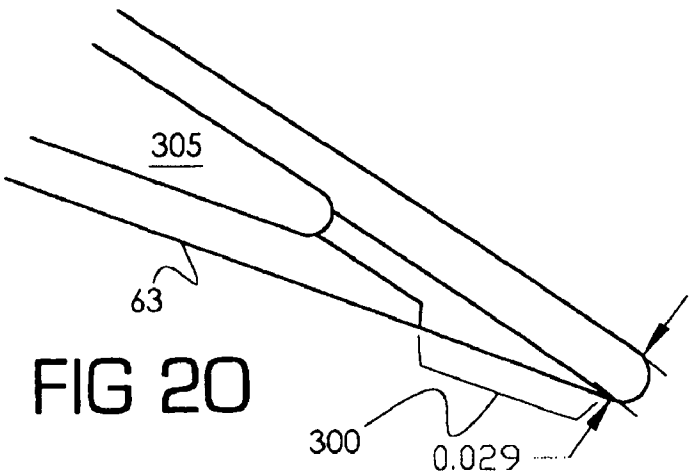
FIG. 20 illustrates how the invention attains a thickness of 0.029 inches at a trailing edge of a turbine blade, yet still provides a passage for cooling air for the trailing edge.

The invention provides a trailing edge thickness of 0.029 inch, plus-or-minus 0.002 inches, as indicated in FIG. 20. That is, under the invention, the thickness ranges between 0.027 and 0.031 inch. In addition, in order to cool the trailing edge, a cooling passage 300 is provided, which connects to an internal cooling cavity 305. Pressurized air is forced through the passage 300 from the cavity 305.

A significant feature is that, under today's technology, providing a central cooling passage in the apparatus of FIG. 20, which is analogous to passage 315 in FIG. 19, is not considered feasible. A primary reason is that the indicated thickness of 0.029 inch in FIG. 20 is considered a minimal limit on material thickness, for reasons of strength.

Restated, if the thickness in FIG. 19 were 0.029 inch instead of 0.050 inch, then, if a passage analogous to passage 315 is provided, the absolute maximum available wall thickness in walls 320 and 325 would be [(0.029/2)-radius of passage 315]. Clearly, even with a radius of 0.001 inch in passage 315, the wall thickness would be less than 0.015 inch, which is below the limit.

The invention of FIG. 20 circumvents this problem by placing the exit to cooling passage 300 entirely on the pressure surface 63.

Thickness of the trailing edge is defined as the diameter of the fillet, or curve, in which the trailing edge terminates. That is, in FIG. 20, one could move downstream of the point at which 0.029 is indicated, and take a measurement at that downstream location. The measurement would be less than 0.029. However, one would be measuring a chord at that point, and not a diameter as required.

Numerous substitutions and modifications can be undertaken without departing from the true spirit and scope of the invention. What is desired to be secured by Letters Patent is the invention as defined in the following claims.

What is claimed is:

1. A system, comprising:

a) a transonic turbine comprising one or more stages, each including i) [rotors] *a rotor* carrying turbine blades, and ii) stators and having a normalized energy extraction per stage above 0.0725 BTU/(lbm*R); and b) means on a rotor for unloading turbine blades at their trailing edges.

2. System according to claim 1, wherein said means comprises a region on a suction surface of a turbine blade, which i) terminates with the trailing edge of the turbine blade, and ii) has no more than six degrees of bending.

3. System according to claim 2, wherein said means has no more than two degrees of bending.

4. System according to claim 2, wherein metal angle of said region continually increases in the downstream direction.

5. System according to claim 4, wherein the first derivative of *the* metal angle continually increases in the downstream direction.

6. A system, comprising:

a) a transonic turbine comprising one or more stages, each including i) [rotors] *a rotor* carrying turbine blades, and ii) stators and having an absolute pressure ratio per stage between 3.5 and 5.0; and b) means on [a] *the* rotor for unloading *the* turbine blades at their trailing edges, *said means comprising a region on a suction surface of a turbine blade that terminates with the trailing edge of the turbine blade and has no more than two degrees of bending, and wherein a metal angle of said region continually increases in the downstream direction, and wherein a first derivative of the metal angle continually increases in the downstream direction*.

[7. System according to claim 6, wherein said means comprises a region on a suction surface of a turbine blade, which i) terminates with the trailing edge of the turbine blade, and ii) has no more than two degrees of bending.]

[8. System according to claim 7, wherein metal angle of said region continually increases in the downstream direction.]

[9. System according to claim 8, wherein the first derivative of metal angle continually increases in the downstream direction.]

[10. A suction side for use in a turbine blade and having an airfoil mouth defined thereon, comprising:

a) a lift region; and c) a trailing surface located downstream of the airfoil mouth and containing no more than two degrees of bending.]

[11. Apparatus according to claim 10, wherein the trailing surface becomes progressively closer to the circumferential direction as the trailing surface progresses in the downstream direction.]

[12. A system, comprising:

a) first and second turbine blades, i) each having a suction side and a pressure side, and ii) both cooperating to form an airfoil passage therebetween which terminates in an airfoil mouth; and b) on the second blade, a suction surface on the suction side which is configured such that: i) all bending, except two degrees of bending, lies forward of the airfoil mouth.]

13. A transonic turbine blade system, comprising:

a) a pair of neighboring blades, which cooperate to define an airfoil passage and an airfoil mouth; *and* b) a suction side on one of the blades, having a blade metal angle defined therein, such that, downstream of the airfoil mouth, the metal angle i) progressively increases in the downstream direction, and ii) has a derivative which also progressively increases in the downstream direction.

14. Apparatus, comprising:

a) a row of transonic turbine blades having trailing edges which are no more than 0.029 inch thick, in which i) airfoil passages are defined between adjacent blades, and ii) expansion waves emanate from points on the suction surfaces of the blades, the points being located on the suction surfaces of the blades; and b) means for creating a cross-passage shock through which the expansion waves pass, to thereby attain a ratio of (maximum static pressure/minimum static pressure) in a 50 percent chord plane of less than 1.35.

15. Apparatus according to claim 14, wherein the means comprises an apparatus for reducing the aerodynamic loading of the trailing edges of the blades.

16. Apparatus comprising:

a) a turbine rotor; and b) blades on the rotor having trailing edges no more than 0.029 inch thick, which i) have a chord length defined therein, *and* ii) are located in a transonic, or greater, flow, and iii) generate a pressure field in which the ratio of (maximum static pressure/minimum static pressure)

in a 50 percent chord plane is less than 1.35.

[17. A turbine blade, comprising:

a) a blade mouth defined on the suction side;

b) 94 degrees or more of curve of the suction side located upstream of the mouth; and c) a trailing edge of thickness between 0.027 and 0.031 inch.]

* * * * *